(12) United States Patent
Nierlich

(10) Patent No.: US 6,187,118 B1
(45) Date of Patent: Feb. 13, 2001

(54) METHOD FOR HEAT-TREATING STEEL WORK PIECES

(75) Inventor: Wolfgang Nierlich, Schweinfurt (DE)

(73) Assignee: SKF GmbH, Schweinfurt (DE)

(*) Notice: Under 35 U.S.C. 154(b), the term of this patent shall be extended for 0 days.

(21) Appl. No.: 09/429,167

(22) Filed: Oct. 28, 1999

(30) Foreign Application Priority Data

Oct. 28, 1998 (DE) .............................................. 198 49 679

(51) Int. Cl.[7] .............................. C21D 8/00; C21D 6/00; C21D 1/04
(52) U.S. Cl. .......................... 148/664; 148/572; 148/567; 148/639; 148/600; 148/662; 148/621; 148/622
(58) Field of Search .................................... 148/572, 567, 148/639, 660, 662, 664, 621, 622

(56) References Cited

U.S. PATENT DOCUMENTS

| | | | | |
|---|---|---|---|---|
| 4,023,988 | * | 5/1977 | Stickels et al. ...................... | 148/12.4 |
| 4,457,789 | * | 7/1984 | Wilks .................................. | 148/134 |
| 4,973,368 | * | 11/1990 | Lund ................................... | 148/12.4 |
| 5,861,067 | * | 1/1999 | Hetzner ............................... | 148/326 |
| 5,906,691 | * | 5/1999 | Burnett et al. ........................ | 148/567 |

FOREIGN PATENT DOCUMENTS

| | | |
|---|---|---|
| 2023064 | 12/1970 | (DE) . |
| 2324750 | 11/1973 | (DE) . |
| 2645544 | 4/1990 | (FR) . |
| 1361553 | 7/1974 | (GB) . |

\* cited by examiner

Primary Examiner—Daniel J. Jenkins
Assistant Examiner—Nicole Coy
(74) Attorney, Agent, or Firm—Burns, Doane, Swecker & Mathis, L.L.P.

(57) ABSTRACT

A method of heat-treating a work piece of high-alloy steel by hardening involves relatively briefly annealing the work piece before hardening, followed by cooling the work piece. The brief annealing that is performed before the actual hardening and the ensuing cooling results in homogeneity of the material in the microscopic range. Following the annealing, the work piece is hardened, for instance by quenching in a salt bath, to achieve a super fine distribution of globular carbides in the microscopic structure with considerably reduced size as compared to the outset state. Also, the microscopic structure created by the method of the invention has improved toughness properties as well as increased microscopic structure stability to aging and leads to a longer service life.

19 Claims, 1 Drawing Sheet

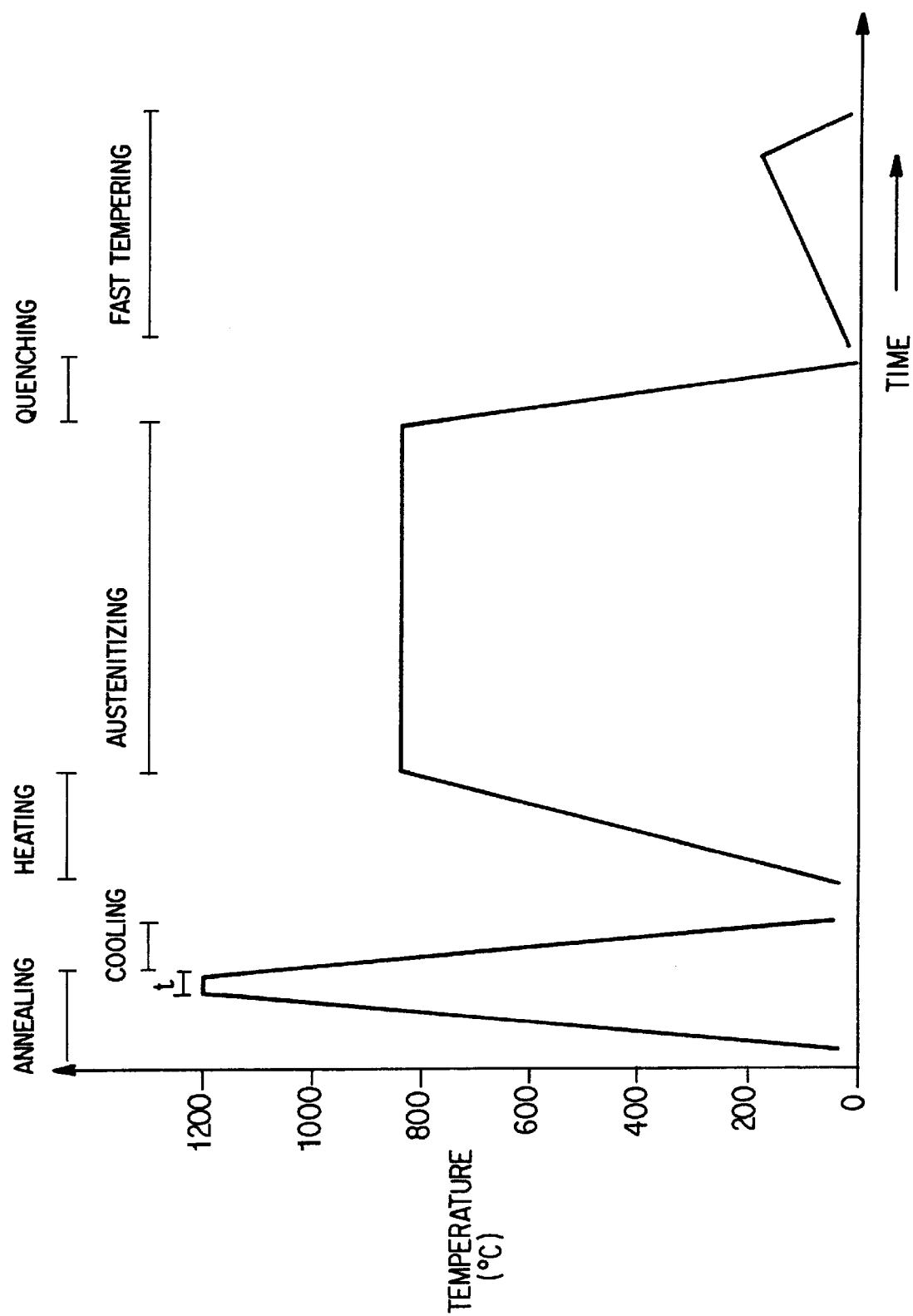

METHOD FOR HEAT-TREATING STEEL WORK PIECES

This application is based on and claims priority under 35 U.S.C. § 119 with respect to German Application No. P 198 49 679.6 filed on Oct. 28, 1998, the entire content of which is incorporated herein by reference.

FIELD OF THE INVENTION

This invention generally relates to heat-treating work pieces. More particularly, the present invention pertains to a method for heat-treating by hardening roller bearing steel work pieces to be used in roller bearings.

BACKGROUND OF THE INVENTION

Steel work pieces, such as roller bearing parts, are subject to stringent demands with respect to strength, length of use and microscopic structural stability against aging. These work pieces require a material that in the machined state has a homogeneous microstructure with super finely-distributed globular carbides.

In order for a homogeneous microscopic structure to be achieved after heat treatment, the melting can be controlled in a special way in the manufacture of the material. This necessitates major effort and expense with respect to monitoring and control devices. It is also known to homogenize the microscopic structure after the melting annealing is performed. As a rule, this annealing extends over several hours.

Especially stringent demands are made of roller bearings intended for use in transmissions because the transmission oil that is used to lubricate the roller bearings becomes contaminated by metal abrasion. It has therefore been proposed that these bearings be sealed off or at least provided with an oil filter that is intended to keep the metal particles from reaching the interior of the bearing and in particular the races. It is also known to carbonitride these bearings. All of the provisions at present entail major effort and expense and are thus not particularly advantageous in practice.

A need thus exists for a method which, in a simple and relatively inexpensive way, achieves homogeneity of the material in the microscopic range and realization of a refinement of the globular carbides, thus allowing work pieces having such characteristics to be used in a variety of contexts, particularly under extreme conditions such as in roller bearings.

SUMMARY OF THE INVENTION

In light of the foregoing, one aspect of the invention involves a method of heat-treating a work piece of high-alloy steel by hardening that involves relatively briefly annealing the work piece before hardening, followed by cooling the work piece. The relatively brief annealing can be performed by electromagnetic induction.

By virtue of the relatively brief annealing that is performed before the actual hardening and the ensuing cooling, homogeneity of the material in the microscopic range is attained. Following the annealing, hardening of the work piece can be carried out, for instance by quenching in a salt bath, to achieve a super fine distribution of globular carbides in the microscopic structure with considerably reduced size as compared to the outset state. Also, the microscopic structure created by the method of the invention has improved toughness properties as well as increased microscopic structure stability to aging and leads to a longer service life.

According to another aspect of the invention, a method for heat-treating a roller bearing steel work piece used in a roller bearing involves heating the work piece to a temperature greater than about 1000° C. and less than the melting temperature of the work piece to anneal the work piece, cooling the annealed work piece, heating the work piece after cooling to an austenitizing temperature, and quenching the work piece that has been heated to the austenitizing temperature.

BRIEF DESCRIPTION OF THE DRAWING FIGURE

The foregoing and additional features of the present invention will become more apparent from the following detailed description considered with reference to the accompanying drawing FIGURE which is a flow chart illustrating the sequence of steps performed in connection with the present invention or timing chart for the roller bearing steel designated as 100 CrMn 6.

DETAILED DESCRIPTION OF THE INVENTION

The present invention pertains to the fabrication of work pieces and has particularly useful application to the fabrication of work pieces in the form of roller bearing rings. In accordance with the present invention, the work pieces are briefly annealed before hardening and are then cooled.

In more detail and as shown in the drawing FIGURE, a mechanically softmachined work piece, such as a roller bearing ring, made of 100 CrMn 6 steel is relatively briefly heated. This relatively brief annealing, which is performed before the actual hardening, is carried out for a period of time specified as the time "t" in the drawing figure and is performed at a temperature preferably between about 1000° C. up to a maximum of just below the melting point of the work piece. The brief annealing is performed for a period of time "t" that can be up to about 120 seconds. Preferably, the time "t" is less than 10 seconds and more preferably, the heating before hardening is carried out over a period of about 5 seconds and at a temperature of approximately 1200° C. This brief heating or annealing can be performed through electromagnetic induction heating, a process that is known and thus will not be described in detail. After such heating, the work piece is then cooled down. This cooling can be carried out as air cooling.

By virtue of the relatively brief annealing that is performed before hardening and the ensuing cooling, homogeneity of the material in the microscopic range or homogeneity of the microscopic structure is attained, at least at the surface and down to a certain depth of the work piece. It is to be understood that because of the interplay between the annealing temperature and the annealing time, the time for carrying out the annealing may be lengthened somewhat if lower temperatures are employed.

After the cooling in air, the work piece is then, in a known manner, heated and brought to the temperature of austenitization, such as approximately 840° C. The work piece is maintained at this temperature for a length of time which can be on the order of about 20 minutes.

After the austenitization, the work piece is quenched, for instance in a salt bath. This quenching can be followed by a conventional tempering or temperhardening. After the hardening that follows the annealing and that is performed in the aforementioned known manner (i.e., quenching in a salt bath), a super fine distribution of globular carbides with considerably reduced size as compared to the outset state is achieved in the microscopic structure. The microscopic structure created by the method of the present invention has improved toughness properties as well as increased microscopic structure stability to aging, thus leading to a longer service life. This is particularly useful and advantageous when the method of the present invention is used to heat-treat roller bearing parts, especially transmission parts.

According to the present invention, it is not necessary for the entire work piece to be annealed uniformly. Rather, according to a further characteristic of the present invention, it is sufficient to perform the annealing process in the surface regions, where the greatest stresses during operation occur. In roller bearings, this is the region of the races. Thus, according to the present invention, the annealing prior to hardening can be performed in the surface regions of the races.

It has been found to be particularly advantageous to use the present invention in connection with roller bearing steels, for instance according to DIN 17230. In this way, an additional increase in the service life is attained because of the increased stability of the microscopic structure to aging.

The steel to which the method the of the present invention can be applied includes roller bearing steel 100 CrMn 6 with 0.9 to 1.05% carbon, 1.35 to 1.65% percent chromium, 0.15 to 0.35% silicon, 0.25 to 0.45% manganese, $\leq 0.030\%$ phosphorus, $\leq 0.025\%$ sulfur, and including an unavoidable residue of other elements.

The increased thermodynamic stability achieved by the present invention is expressed in a measurably reduced drop in hardness upon tempering. This was confirmed by testing using work pieces of 100 CrMn 6 that were produced by the method of the present invention.

The principles and preferred embodiment of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A method for heat-treating a roller bearing steel work piece used in a roller bearing comprising:

heating the work piece to a first temperature greater than about 1000° C. and less than a melting temperature of the work piece and maintaining the temperature of said work piece at a temperature equal to or greater than said first temperature for a period of time not greater than 120 seconds, and cooling the work piece after said heating to anneal the work piece and produce an annealed work piece;

heating the work piece resulting from said cooling to an austenitizing temperature; and quenching the work piece that has been heated to the austenitizing temperature.

2. The method of claim 1, wherein the annealing is performed by heating the work piece by electromagnetic induction.

3. The method of claim 1, wherein the heating of the work piece to anneal the work piece is performed for less than 120 seconds.

4. The method of claim 1, wherein the heating of the work piece to anneal the work piece is performed for less than ten seconds.

5. The method of claim 1, wherein the annealing of the work piece is limited to surface regions of the work piece.

6. The method of claim 1, wherein the roller bearing steel is steel designated as 100 CrMn 6.

7. A method for heat-treating a work piece of high-alloy steel by hardening, comprising:

annealing the work piece by heating the work piece to a first temperature and maintaining the temperature of said work piece at a temperature that is substantially equal to or greater than said first temperature for a period of time not greater than 120 seconds, before hardening followed by cooling the annealed work piece.

8. The method of claim 7, wherein the annealing is performed by heating the work piece by electromagnetic induction.

9. The method of claim 8, wherein the annealing is performed at a temperature of from approximately 1000° C. to a maximum temperature of just below a melting point of the work piece.

10. The method of claim 7, wherein the annealing is performed at a temperature of from approximately 1000° C. to a maximum temperature of just below a melting point of the work piece.

11. The method of claim 7, wherein the work piece is annealed for up to 120 seconds.

12. The method of claim 9, wherein the work piece is annealed for less than 120 seconds.

13. The method of claim 7, wherein the work piece is annealed for less than ten seconds.

14. The method of claim 9, wherein the work piece is annealed for less than ten seconds.

15. The method of claim 14, wherein the annealing is limited to surface regions of the work piece.

16. The method of claim 9, wherein the annealing is limited to surface regions of the work piece.

17. The method of claim 7, wherein the annealing is limited to surface regions of the work piece.

18. The method of claim 7, wherein the steel is a roller bearing steel in accordance with DIN 17230.

19. The method of claim 7, wherein the steel is steel designated as 100 CrMn 6.

* * * * *